United States Patent [19]
Smith

[11] 3,777,184
[45] Dec. 4, 1973

[54] STABILIZED PULSE GENERATOR WITH VARIABLE OUTPUT

[75] Inventor: James A. Smith, Rochester, N.Y.

[73] Assignee: Health-Tronics, Inc., Victor, N.Y.

[22] Filed: Feb. 11, 1971

[21] Appl. No.: 114,481

[52] U.S. Cl. .......... 307/268, 307/252 F, 307/265, 307/269, 307/284

[51] Int. Cl. .......... H03k 5/04, H03k 3/35

[58] Field of Search .......... 307/252 F, 265, 268, 307/269, 284

[56] References Cited

UNITED STATES PATENTS 3,167,661 1/1965 Rhodes .......... 307/268 X

OTHER PUBLICATIONS

G. E. Application Note No. 90.70 "The D13T–A Programmable Unijunction Transistor" by W. R. Spofford, Jr. Nov. 1967 page 7

*Primary Examiner*—John Zazworsky
*Attorney*—Hoffman Stone

[57] ABSTRACT

Each data channel includes signals defining two successive, approximately equal intervals thereby enabling reliable, error-free signal transmission despite serious signal degradation due to limitations of the signalling medium. Typically, transmission is over ordinary telephone lines, which degrade sharply defined pulse signals from the transmitter almost to simple sine wave signals at the receiver. Modulation consists of variations in the sum of the two intervals, and the effects of distortion and degradation caused by the line are minimized. Frame synchronization is achieved by transmitting signals defining two intervals shorter than the shortest interval permitted in the data channel. The claims of this application are directed to the pulse generator of the transmitter, which includes a capacitor connected to be discharged through a programmable unijunction transistor. The capacitor is charged from a constant current source, and is given a small pedestal charge immediately after it is discharged.

4 Claims, 3 Drawing Figures

STABILIZED PULSE GENERATOR WITH VARIABLE OUTPUT

BRIEF DESCRIPTION

This invention relates to a novel system for signal transmission, and, more particularly, but not limited to, a novel signalling system especially well suited for transmitting signals over ordinary telephone lines.

There appears to be a substantial potential demand for centralized medical services requiring efficient transmission of analog and digital data from points of origin to a central location at low cost. The system of the present invention was developed with this special purpose in mind to facilitate, for example, transmission of electrocardiograms and patient identifying data from a remote location to a central service office over ordinary telephone lines. The cardiograms may be analyzed by a computer at the central office and stored in a data store there for future reference, thus enabling the cardiologist who makes the diagnosis in each case to handle a larger number of cases, and also providing him with ready access to the patient's history.

The system of the invention is also expected to be found advantageous in many other utilizations where it may be desired to transmit multiplexed signals at reasonably high speeds, with a high degree of reliability and at low cost, particularly with respect to the cost of the terminal equipments.

Briefly, the signalling system of the invention is based on a free-running time interval modulation scheme in which the duration of the successive time frames normally varies during signal transmission about a value equal to the duration of a frame in which no modulation is applied to any of the data channels. The condition of each signal to be transmitted is sampled once during each frame in accordance with conventional time division multiplexing practice, and the samples are applied to modulate the respective channels by appropriately varying the durations of intervals between successive pulses produced by a pulse generator. Two intervals are allotted to each channel. The output of the pulse generator is converted to a bi-polar pulse train for transmission.

The signalling system of the invention is especially suited for reliable, fairly high speed date transmission over ordinary telephone lines despite the degradation caused by the well-known limitations of lines of this kind. The signals are transmitted in the form of a series of electrical pulses successively alternating in polarity, thereby avoiding any effect on the d.c. line voltage. Also, two pulses are transmitted for each data bit, thereby introducing sufficient redundancy to compensate for the inductive and capacitative losses on the line.

The modulation scheme of the invention is time interval modulation, a variation of phase modulation, and may be represented by variations in the intervals between the leading edges of successive square waves. The square waves are differentiated to produce a series of alternately positive and negative pulses, which are applied at the input end of the telephone line. The signal received at the remote end of the line is greatly degraded, and when displayed on an oscilloscope, locks more like a series of sine waves, successive ones of the waves having different respective periods in accordance with the modulation. The telephone line tends to obscure variations in the intervals between successive ones of the transmitted pulses, but two intervals taken as a pair correspond to a full sine wave, and differences between the periods of successive full sine waves can be reliably detected at the receiver.

Transmitting all the available pulses also ensures the reception of the maximum signalling information at the receiver, thereby also contributing to reliability despite signal degradation.

The receiver is synchronized with the transmitter for channel distribution purposes by transmission of a special pair of pulses defining intervals shorter than the shortest permissible interval in the data channels. The receiver is reset in response to the synchronizing signals to read the next succeeding pair of intervals as the first data channel of the frame. Thus, the number of channels in the frame can be varied by appropriate changes in the transmitter, and the receiver follows automatically without the need for special adjustment.

Timing of the durations of the sucessive intervals in the data channels is done by charging of a capacitor from a constant current source to trigger a controllable avalanche discharge device. The capacitor is given a reference charge at the beginning of each channel to immunize the circuit against variations in supply voltage, temperature, and other ambient conditions.

DETAILED DESCRIPTION

A presently preferred embodiment of the invention will now be described in connection with the accompanying drawings, wherein.

Figure 1:
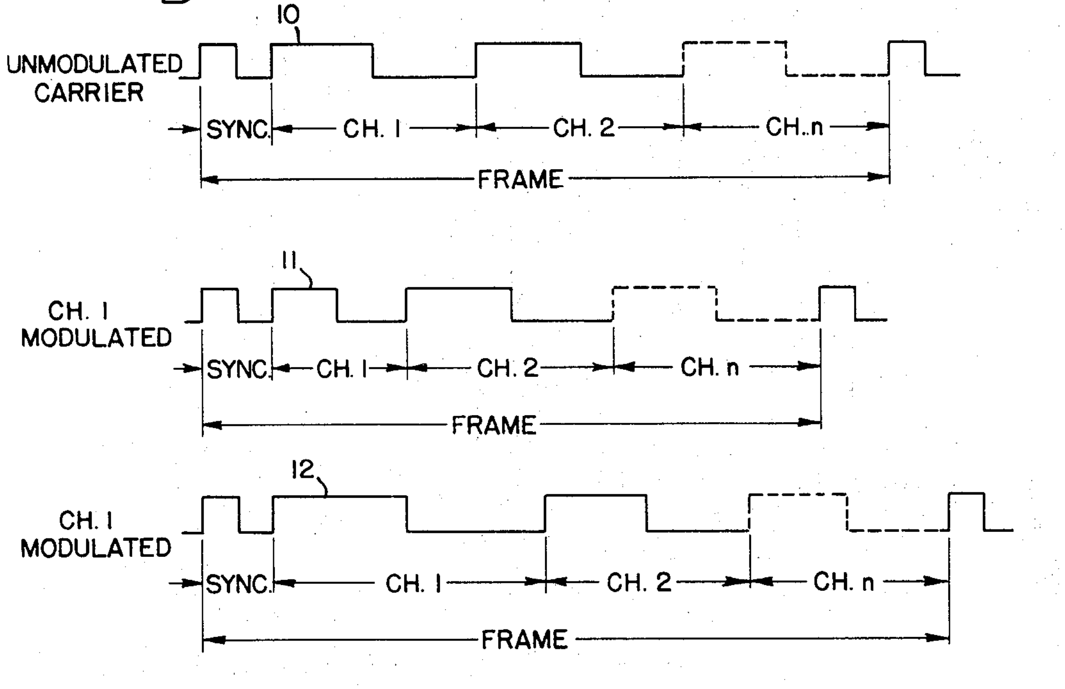
FIG. 1 is a schematic timing diagram illustrating the framing and synchronizing system of the invention.

The first curve 10 in FIG. 1 shows timing of a typical frame in the multiplex scheme of the invention having *n* data channels and one synchronization channel, as the frame would appear on an oscilloscope without modulation in any channel. The other curves 11 and 12 illustrate the variations introduced by modulating the data channels by introducing variations in their respective durations. It is seen that the duration of the frame itself varies from frame to frame, oscillating about what may be referred to as the nominal duration, that is, the duration when none of the channels are modulated. A special synchronizing signal is transmitted at the beginning of each frame consisting of signals defining intervals shorter than the shortest intervals permitted in any of the data channels. The receiver recognizes the extra short intervals and is reset in response to them.

The circuit as shown was designed especially for signalling over ordinary telephone lines, coupling inductively into the telephone receiver, and using the side tone coupling in the telephone subset to insert the signals into the line.

Figure 2:
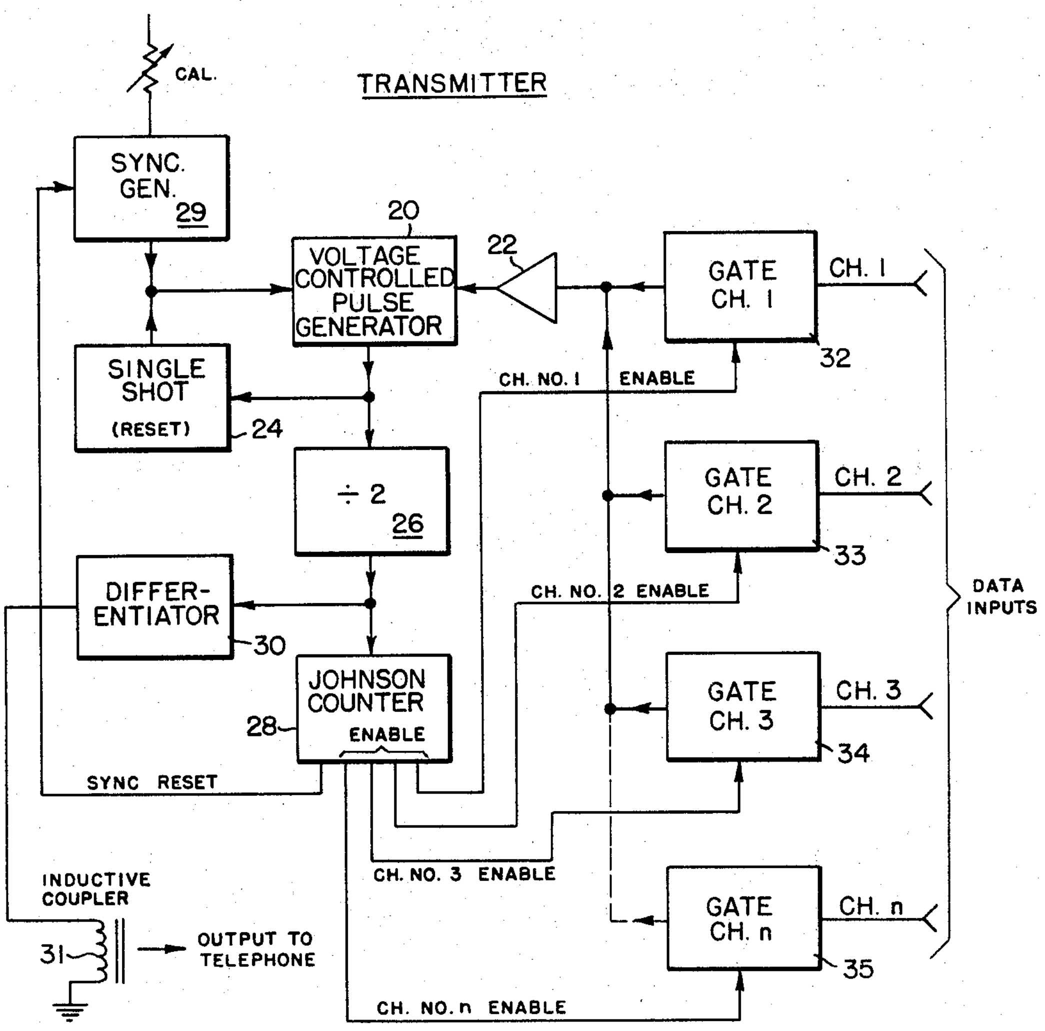
FIG. 2 is a schematic block diagram of a transmitter according to the invention.
Figure 4:
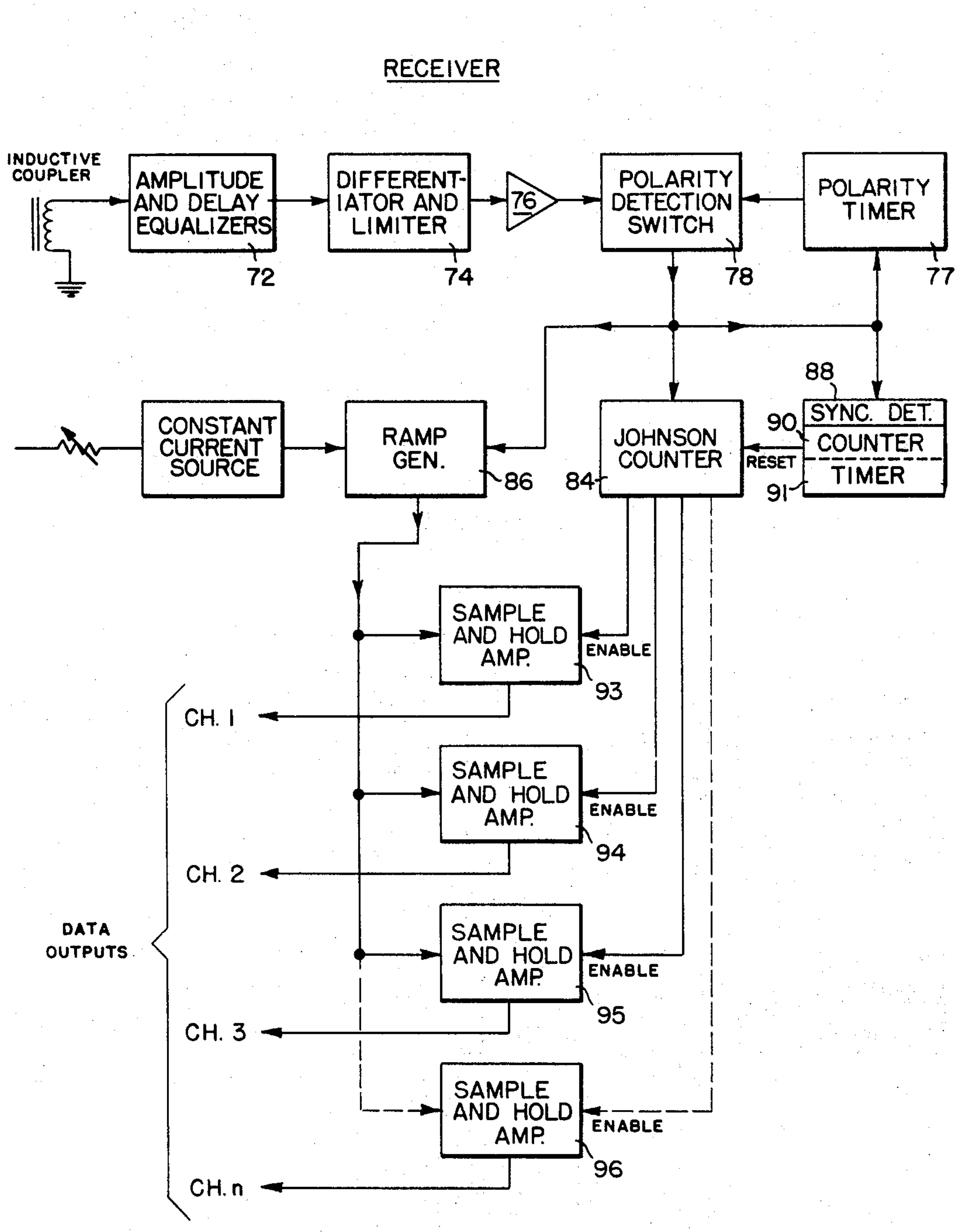

The block diagram of the transmitter is shown in FIG. 2. It includes a volage controlled pulse generator 20, which produces output pulses time spaced in accordance with the value of the signal input voltage applied from an operational amplifier 22. The output of the pulse generator 20 is fed to a one shot multivibrator 24, the output of which resets the generator 20. The pulse output is also fed to a divide-by-two counter 26 to produce a square wave signal of the kind shown in FIG. 1, which is fed through a differentiator 30 to produce the bi-polar pulse signal to be transmitted. The bi-polar signal may be applied to a coil 31 for inductive coupling to the receiver of a telephone handset, and, through the side-tone coupling of the telephone, onto the line.

The square wave output of the divide-by-two counter 26 is also applied to a Johnson counter 28 to drive it. The Johnson counter 28 is the channel multiplexer. It is arranged to step only in response to the positive-going voltage changes of the square wave so that each date channel includes two successive intervals, each defined by one half of one of the square waves illustrated in FIG. 1. The outputs of the Johnson counter are connected to enable the synchronizing signal generator 29 and the input gates 32, 33, 34, and 35 in sequence. The outputs of the input gates 32, 33, 34, and 35, which may be in either analog or digital form, are fed in sequence through the operational amplifier 22 to the pulse generator 20 to control the intervals between successive pulses produced by it.

Figure 3:
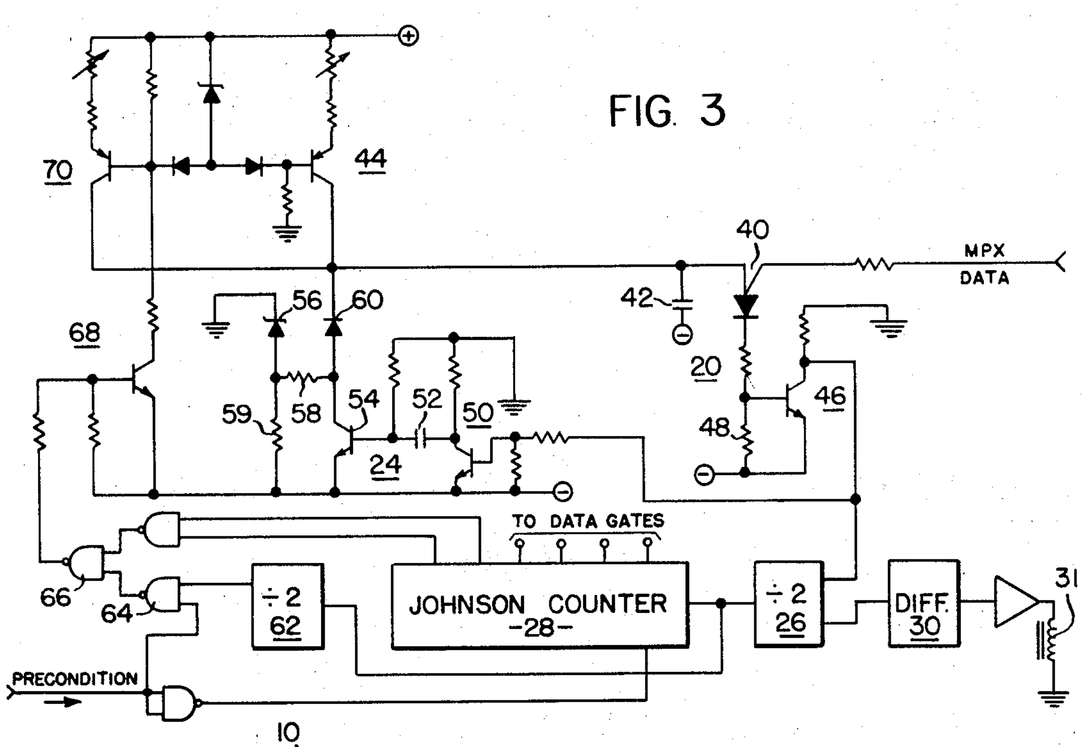
FIG. 3 is a schematic circuit diagram of the transmitter.

A schematic diagram of the transmitter is shown in FIG. 3. The pulse generator 20 includes a programmable unijunction transistor 40, a capacitor 42, a high impedance, constant current source 44, and a pulse amplifier 46. The output of the operational amplifier 22 (FIG. 2) is applied to the gate electrode of the transistor 40. The capacitor 42 is connected in shunt with the anode-to-cathode circuit of the transistor 40, and is charged by current from the source 44. When the voltage across the capacitor reaches the breakdown voltage of the transistor 40 as set by the value of the voltage on its gate electrode, the transistor 40 conducts as an avalanche device, and the capacitor discharges rapidly through the transistor producing an output pulse across its cathode resistor 48. The output pulse is fed through the amplifier 46 to step the divide-by-two counter 26, and also to trigger the reset circuit 24 on the trailing edge of the pulse.

The reset circuit 24 includes a buffer amplifier 50 and a reset amplifier 54, both of which are biased to be normally conducting. The leading edge of the pulse from the pulse amplifier 46 drives the buffer amplifier 50 toward cut-off, and the buffer amplifier drives the reset amplifier 54 toward saturation. During the pulse, the coupling capacitor 52 between the amplifiers 50 and 54 charges rapidly. On the trailing edge of the pulse, the buffer amplifier 50 is restored to its normal bias, and the charge on the coupling capacitor 52 drives the reset amplifier 54 momentarily to cut-off. When the reset amplifier 54 is cut off, the timing capacitor 42 in the pulse generator is rapidly charged through a Zener diode 56, the collector resistor 58 of the reset amplifier and a diode 60 to a low starting voltage determined by the Zener diode 56, which is connected between ground and the junction point between the two collector resistors 58 and 59.

This pre-charge of the timing capacitor 42 to a fixed value following each output pulse and immediately before the start of each interval to be timed makes the timer highly immune to the effects of variations in the battery voltage and of variations in the completeness of discharge of the capacitor 42 through the transistor 40 such as may be caused by temperature variations, for example.

A second divide-by-two counter 62 is driven by the output of the first divide-by-two counter 26 for preliminary line testing and checking purposes. When a connection is first established through the telephone system, a so-called preconditioning signal is applied for a predetermined interval of about eighty milliseconds, or so, to the Johnson counter 28 and to a gate 64. The second input of the gate 24 is the output of a second divide-by-two counter 62 which is driven by the Johnson counter. The output of the gate 64 is applied through a succeeding gate 66 to drive the synchronization drive amplifier 68. During the preconditioning signal, the transmitter sends a synchronizing signal after each data channel signal.

The synchronizing signal is produced by enabling a second constant current source 70 in parallel with the normal source 44 for charging the timing capacitor 42 in a shorter interval than allowable under other conditions. When the Johnson counter 28 steps to its "sync" condition, it inhibits all of the input gates 32–35, the output of the operational amplifier 22 is at ground, and the transistor 40 operates in its conventional mode.

The number of channels provided may be varied by changing the number of the input gates 32–35, and appropriately changing the Johnson counter 28.

What is claimed is:

1. A pulse generator for producing a series of time spaced electrical pulses comprising:

a. a triggerable avalanche discharge device, b. a capacitor connected to said device for triggering it and discharging through it when it is triggered, c. a constant current source for charging said capacitor to a voltage sufficient to trigger said device, and d. means for rapidly charging said capacitor immediately after it is discharged to a predetermined voltage less than required to trigger said device, whereby the intervals between successive pulses produced by the pulse generator are made substantially independent of ordinary variations in supply voltages and other ambient conditions.

2. A pulse generator according to claim 1 wherein said avalanche device is a programmable unijunction transistor.

3. A pulse generator according to claim 2 also including means for varying the bias between the gate electrode and the cathode of said programmable unijunction transistor thereby to vary the intervals between successive pulses produced by the pulse generator.

4. A pulse generator according to claim 1 including an auxiliary current source connected in parallel with said constant current source for charging said capacitor, and means for alternately enabling and inhibiting said auxiliary current source.

* * * * *